TEMPERATURE COMPENSATED SEMI-CONDUCTOR DEVICES

Filed May 20, 1955 2 Sheets-Sheet 1

INVENTOR.
RICHARD F. RUTZ
BY [signature]
ATTORNEY

INVENTOR.
RICHARD F. RUTZ
BY
ATTORNEY

United States Patent Office 2,846,592
Patented Aug. 5, 1958

2,846,592

TEMPERATURE COMPENSATED SEMI-CONDUCTOR DEVICES

Richard F. Rutz, Fishkill, N. Y., assignor to International Business Machines Corporation, New York, N. Y., a corporation of New York Application May 20, 1955, Serial No. 509,853
20 Claims. (Cl. 250—211)

The present invention relates to temperature compensated semi-conductor device, and praticularly to transistors compensated to reduce the variations in output which commonly accompany variations in temperature.

All semi-conductive devices have characteristics which vary more or less with temperature. Such variations are in many cases detrimental to proper operation of the circuits in which the semi-conductive devices are connected.

Semi-conductive devices generally have light sensitive characteristics, frequently associated with PN junctions. However, those characteristics may also be affected by temperature variation, which may arise because of heat resulting from current flow, from the light itself, or from other sources. It has not been possible in such devices to separate the temperature response from the light response and thereby to measure accurately the intensity of light.

PN junctions are frequently employed in transistors as emitters of minority current carriers. Such a junction may be reverse biased to inhibit the emission of such carriers. However, since such carriers are produced by the application of heat, it becomes necessary as the operating temperature increases to employ a higher reverse bias potential to hold the transistor cut off, or to cut it off after a period of conduction.

The necessity for compensating for changes in transistor characteristics with temperature has become increasingly serious as the current carrying capacity of transistors has increased. For example, there is shown and described in my copending application, Ser. No. 458,619, filed September 27, 1954, entitled "Transistor Circuit Element," a transistor which may be connected as shown in Fig. 7 of that application, so as to have a bistable characteristic, including a low current conduction state and a high current conduction state. Since at least one of the two regions of the transistor body necessarily has substantial resistivity and a substantial temperature coefficient of resistance, such transistors tend to heat up during periods of high current flow. If the periods of high current flow are prolonged or frequent, the heating may change the transistor characteristics to such an extent that the bias potential is no longer effective to hold the transistor "off," and it may remain continuously in its high current conduction state.

An object of the present invention is to provide improved means for compensating a semi-conductor device for variations in temperature.

Another object is to provide a transistor having improved temperature compensating means.

Another object is to provide a transistor or semi-conductive device of the type described, in which the temperature compensating element is part of the same body of semi-conductive material as the transistor or semi-conductive device.

Another object of the invention is to provide a temperature compensated light sensitive transistor, which responds only to variations in light intensity and remains substantially unaffected by changes in temperature.

Another object is to provide means for compensating a reverse biased PN junction for variations in temperature.

The foregoing and other objects of the invention are attained in the structures described herein by providing a main circuit branch in series with the boundary junction whose temperature it is desired to compensate. A compensating branch circuit is then connected in parallel with the main circuit branch. This compensating branch includes a diode having a PN junction whose temperature response characteristics are substantially the same as those of the junction to be compensated. If the two junctions are then exposed to the same temperatures, variations in current flow through the first junction will be compensated by equal variations through the second junction and there will be substantially no variation due to temperature in the current flow through the main circuit branch.

In several of the embodiments of the invention disclosed herein, the compensating junction and the junction being compensated are both parts of the same semi-conductive body. In other modifications, the two junctions are structurally separate and connected by electrical conductors.

In many of the modifications, the semi-conductive device is a transistor connected in a bistable circuit which is tripped from one stable conductive state to another by either an electrical signal or a light signal. In the light sensitive embodiments, the compensating junction must be shielded from the light. In all cases the compensating junction must be at the same temperature as the junction being compensated.

Other objects and advantages of my invention will become apparent from a consideration of the following description and claims taken together with the accompanying drawings.

Figure 1:
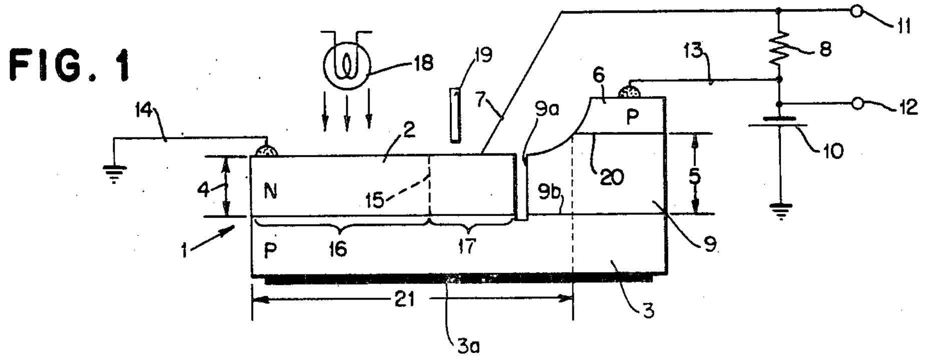
Fig. 1 is a somewhat diagrammatic illustration of a transistor and an electric circuit therefor embodying my invention.

*Fig. 1*

There is shown in this figure a transistor generally indicated at 1, of the general type descirbed in my copending application Serial No. 458,619, mentioned above. The transistor 1 comprises a body of semi-conductive material divided into an N region 2 and a P region 3, the two regions being separated by a boundary junction 16, 17. The N region 2 has a substantially (about ten times) higher resistivity than the P region 3, and its thickness is substantially equal to or less than the diffusion length for the average lifetime of minority carriers in the region (0.005" for commonly used materials). This thickness is indicated in Fig. 1 by the reference numeral 4. The P region 3 is, as indicated above, of lower resistivity than the N region 2. The P region 3 is covered over substantially its entire lower surface with a low impedance contact 3*a*, and is made sufficiently thin (.0001", for example), so that there is substantially no potential drop throughout it. The region 3 operates as a substantially equi-potential region.

Another N region 9, which may have been formed integrally with N region 2, but is now separated therefrom by means of a notch or saw-cut 9*a*, is separated from P region 3 by a junction 9*b*.

The thickness 5 of this N region 9 is made substantially greater than the diffusion length for the average lifetime of the minority carriers therein. On top of the N region 9, there is formed another P region 6, hereinafter referred to as the compensating P region. The PN junction 20, between regions 9 and 6, is hereinafter referred to as the temperature compensating junction. By making the thickness 5 greater than the diffusion length, junction 20 is prevented from acting as a collector for holes emitted from junction **9*b***, so that no transistor action takes place there.

A collector 7, which may be an electro-formed point contact, or may be otherwise constructed to have a high intrinsic current amplification, engages the N region 2. The collector 7 is connected through a load resistor 8 and a battery 10 to ground. Output terminals 11 and 12 are connected to the opposite terminals of resistor 8. A wire 13, ohmically connected to the P region 6, as by a soldered connection, connects that region to the negative terminal of battery 10.

The left-hand end of the N region 2 is connected to ground through a wire 14. This connection corresponds most nearly to the base in a conventional transistor. The P region 3 is floating, i. e., it is not electrically connected externally.

Since the right-hand portion of N region 2 is connected through collector 7 to a source of negative potential, and the left-hand end of that region is grounded, there is produced a potential gradient across it. Since the P region 3 has substantially the same potential throughout, it assumes a potential intermediate between that of the collector 7 and ground, which potential is equal to that at some transverse plane in the region 2 as indicated at 15 in Fig. 1. At the intersection of the plane 15 with the junction between zones 2 and 3, the potential across the junction is zero. That intersection is referred to hereinafter as the equipotential point. The boundary junction between the N region 2 and the P region 3 is thereby divided at 15 into a reversely biased portion 16 and a forwardly biased portion 17. The location of the equipotential point is determined by the potential gradient across the N region 2, which is in turn determined by the potential of battery 10 and the spacing between collector 7 and base connection 14.

The reserve biased portion 16 of the junction between regions 2 and 3 is subject to light impinging from a source such as indicated at 18. (The region 2 is sufficiently thin so that it does not shield the junction.) If necessary, a suitable shield structure 19 is placed to prevent light from source 18 from falling on the collector 7 and on junction 20 between N region 9 and P region 6.

*Operation on Fig. 1*

When no light from the source 18 is falling on the transistor 1, then the reverse bias on the portion 16 of the junction between regions 2 and 3 is effective to limit the current flow through the P region 3 to the saturation current for that junction portion. The saturation current for the reverse biased junction 20 is substantially equal to that value. The current flowing through the P region 3 then passes from ground through wire 14, region 2, reverse biased junction 16, P region 3, forwardly biased junction **9*b*, and thence across the N region 9 to the reversed biased junction 20 and thence through battery 10 back to ground. Electrons are flowing from collector 7 through N region 2 to base 14, but they do not substantially affect the hole current flow in the P region 3**.

Now, if it is assumed that a light signal of an intensity greater than a predetermined threshold value impinges on the N region 2 adjacent the junction 16, then the effectiveness of the reverse bias on that junction is reduced, since the incident light produces hole-electron pairs in the semi-conductor material, increasing its conductivity. Increasing current through the reverse biased junction 16 is accompanied by an increased emission of holes through the forwardly biased junction 17, which holes diffuse across the thin N region 2 to the collector 7, where their effect is amplified by the intrinsic current amplification of the collector. This intrinsic current amplification of the collector produces an increased number of electrons which flow for the most part directly through the N region 2 to the grounded base 14. The transistor is then shifted from its "off" condition to an "on" condition which is maintained as long as the light continues to shine from source 18 on the reverse biased junction 16.

The light shining on the junction 16 and the current flowing through the transistor body 1 both tend to raise the temperature of the transistor body, with an accompanying decrease in the impedance of the reverse biased junction 16. This decrease in impedance causes an increased current flow through that junction. The compensating P region 6 is provided to eliminate this increment of current flow from the load resistor 8, so that the current flow through that resistor is substantially unaffected by temperature changes at the junction 16 and consequently represents a true measure of the light intensity of source 18.

The junction 20 between N region 9 and P region 6 is chosen to have current-temperature characteristics similar to those of the reverse biased portion 16 of the junction between N region 2 and P region 3. The junction 20 is reverse biased by the connection of region 6 to the negative battery terminal through wire 13. The junction 20 follows closely the variations in temperature at junction 16, since these junctions are in close thermally conductive relation. Since the area, the reverse bias, and the current-temperature characteristics of junction 20 are substantially the same as those of the reverse biased junction portion 16, it may be seen that an increase in current flow through junction 16 due to a temperature change is accompanied by a substantially equal increase in current flow through junction 20.

Junction 20 is effectively in parallel with load resistor 8, and carries the current variations due to temperature changes at junction 16, so that those variations do not affect the current flow through resistor 8. Neither do they effect the magnitude of the threshold signal required to turn the transistor "on."

It is not necessary that the notch **9*a* be deep enough to separate completely the two N regions, but it is necessary that the transistor be so constructed that substantially all current flow from ground connection 14 to junction 20 pass through the reverse biased junction 16. In other words, if the N regions 2 and 9 are not completely separated, as by notch 9*a*, then the impedance to current flow from wire 14 to junction 20 directly through the two connecting N regions must be substantially greater than the impedance to current flow from wire 14 through reverse biased junction 16, P region 3, contact 3*a*, junction 9*b* and region 9 to junction 20. This relationship of the impedances of the two paths may be attained by properly coordinating the resistivities of the N and P regions, the distance 21 between wire 14 and the nearest point on junction 20, and the cross-sectional area of N-type material remaining under the notch 9*a***.

Figure 2:
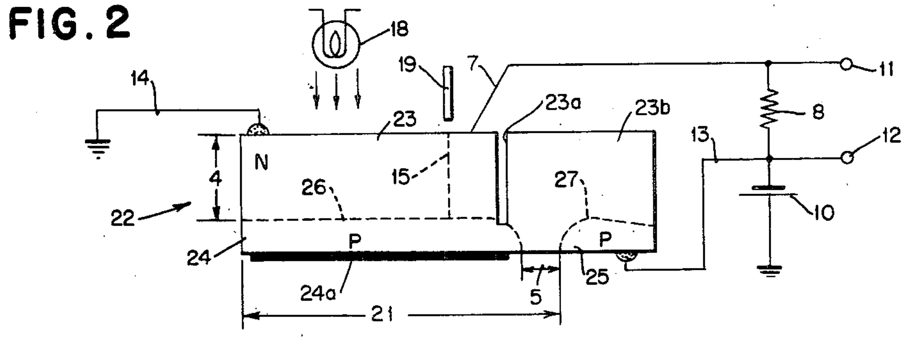
Fig. 2 is a somewhat diagrammatic illustration of another form of transistor structure embodying the invention, together with a circuit therefor.

*Fig. 2*

This figure illustrates a modified form of transistor structure which may be used in place of the transistor 1 of Fig. 1. The circuit employed is otherwise the same as in Fig. 1. Those elements in Fig. 2 which correspond fully to their counterparts in Fig. 1 have been given the same reference numerals and will not be further described.

There is shown in Fig. 2, a transistor generally indicated at 22 including a high resistivity N region 23 separated by a notch **23*a* from another N region 23*b*. A low resistivity P region 24 connects the N regions 23 and 23*b*. Another P region 25 has a common boundary 27 with region 23*b*. Both the P regions 24 and 25** are located on the surface of the transistor opposite the N regions 23 and 23*b*, and are respectively separated from the N regions 23 and 23*b*, respectively, by boundary junctions 26 and 27. P region 24 is provided over substantially its entire surface with a low impedance contact 24*a*.

The distance between collector 7 and the junction 26 is subject to the same limitation as in Fig. 1. In other words, that distance must be substantially no greater than the diffusion length for the average lifetime of minority carriers in the region 23. Furthermore, the limitation as to the nearest spacing between the two P regions 24 and 25 is the same as that between the two P regions 3 and 6 in Fig. 1, i. e., it must be greater than that diffusion length, as indicated by the dimension 5 in Fig. 2. The dimension 21 in Fig. 2, like the corresponding dimension in Fig. 1, is important only in those cases where notch 23*a* does not completely separate the two N regions 23 and 23*b*.

The operation of the transistor 22 in the circuit of Fig. 2 is completely analogous to the operation of the transistor 1 in Fig. 1, and will not be further described.

Figure 3:
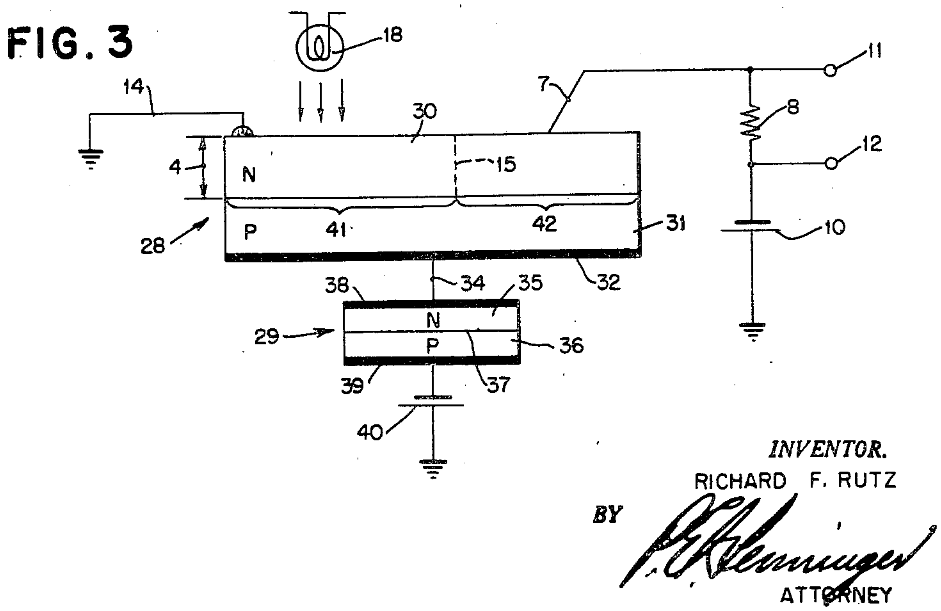
Figs. 3, 4, 5, 6 and 7 represent somewhat diagrammatically, alternative modes of transistor construction, each with a suitable circuit.

*Fig. 3*

This figure illustrates a circuit similar to those of Figs. 1 and 2, using a somewhat different transistor generally indicated at 28, and a structurally separate temperature compensating diode 29 instead of a temperature compensating junction built into the transistor structure, as in the devices of Figs. 1 and 2.

The transistor 28 comprises an N region 30 and a P region 31. As in the transistors of Figs. 1 and 2, the N region 30 has a high resistivity, and its thickness 4 is equal to or less than the diffusion length for the average lifetime of minority carriers. The P region 31 is of relatively low resistivity material and has an ohmic contact 32 extending over its entire surface and connected through a wire 34 to a diode 29. Diode 29 comprises a semi-conductive body including an N region 35 and a P region 36 separated by a boundary junction 37. Wire 34 is connected to an ohmically conductive contact 38 extending over the whole surface of region 35. A similar ohmic contact 39 extending over the surface of region 36 is connected through a biasing battery 40 to ground.

The temperature response characteristics of the diode 29 are matched as closely as possible to those of the reverse biased portion 41 of the junction between the N region 30 and the P region 31. The diode 29 is shielded from the light source 18 by the transistor body or by additional shielding means if required. The diode 29 should be in close proximity to the transistor 28 so that both are at the same ambient temperature and so that changes in temperature of the transistor 28 are rapidly communicated to diode 29.

In Fig. 3, the temperature compensating junction 37 in the diode 29 is biased by a separate battery 40, rather than by the battery 10.

The potential of the negative terminal of battery 40 is more negative than collector 7, and preferably more negative than the negative terminal of battery 10.

*Operation of Fig. 3*

The diode 29 is reversely biased under all conditions and its characteristic saturation current flows through it. When no light falls on the transistor, all or most of its PN junction is reverse biased and its own characteristic saturation current flows through it. When the junctions are designed properly, these currents are substantially equal, and practically none of the transistor junction will be forward biased to supply holes to the collector 7. If the balancing is not perfect, a negligibly small amount of holes may be supplied to the collector.

When a light signal from source 18, having an intensity greater than a predetermined threshold value, strikes the transistor 28, but not the diode 29, then the P region 31 collects the holes created by the light in its reverse biased portion and re-emits them in its forward biased portion, whereupon they are collected at the collector 7. Due to the intrinsic amplification of the collector, an amplified collector current will flow whose magnitude is proportional to the light intensity.

Changes in temperature produce equal changes in the current through the reverse biased junction of the transistor and through the reverse biased diode 29. Consequently, the temperature changes do not affect the number of holes emitted from the forward biased portion 42 of the PN junction in transistor 28. Consequently, the current flow through the transistor at cut off is not substantially affected by temperature changes. Furthermore, the back resistance of the collector changes only in accordance with the temperature characteristic of the point contact collector 7, which is much less sensitive to temperature than the PN junction.

As in Fig. 1, the compensating diode 29 is effectively in parallel with the load resistor 8, and carries the current variations due to temperature so that such variations do not appear in resistor 8. Neither do they affect the magnitude of the tripping light signal.

When the junction of diode 29 is constructed to balance exactly the characteristics of the entire junction, including both portions 41 and 42, of the transistor, then the temperature compensation is best, especially with respect to maintenance at a constant value of the threshold signal which will trip the transistor.

When part of the junction, for example, portion 42, is forwardly biased, the temperature compensation is not quite as good, but on the other hand the transistor may be more sensitive, i. e., a smaller threshold signal may be used, and/or a faster response to the threshold signal may be obtained.

Figures 4, 5:
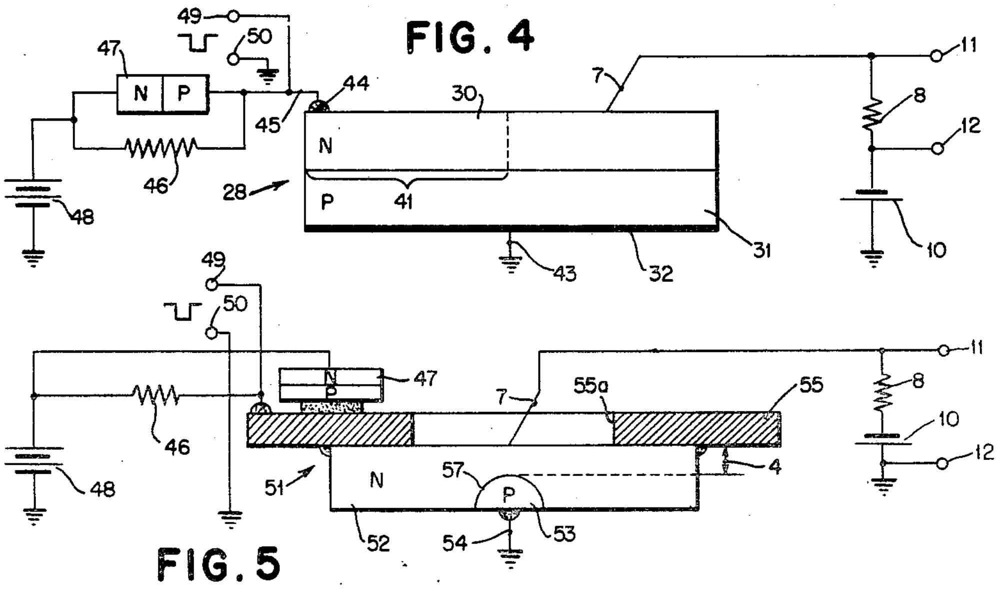

*Fig. 4*

This figure illustrates a transistor 28 which may be the same as the transistor 28 of Fig. 3, connected in a somewhat different circuit configuration, and arranged to be tripped between its two stable conditions by an electrical input signal, as well as by a light signal. In Fig. 4, those circuit elements having the same structure and function as their counterparts in previous figures have been given the same reference numerals and will not be further described.

The P region 31 is connected through a wire 43 to ground. This connection corresponds most nearly to the emitter in a conventional transistor. The ohmic contact 44 at the left-hand end of the N region 30 is connected to a wire 45, and thence through a resistor 46 in parallel with a junction diode 47 to the positive terminal of a biasing battery 48 and from the negative terminal of battery 48 to ground. Electrical input signals are received at input terminals 49 and 50. Input terminal 49 is connected to wire 45 and input terminal 50 is grounded.

*Operation of Fig. 4*

The diode 47 is arranged to compensate the negatively biased portion 41 of the junction between N region 30 and P region 31, for changes in its characteristics due to temperature variations. The battery 48 is effective to reversely bias both diode 47 and the junction portion 41. When no signal is received at input terminals 49 and 50, then the battery 48 maintains the transistor 28 biased to cut off. An input signal at terminals 49 and 50, having an amplitude greater than a predetermined threshold value, decreases the reverse bias across junction 41 to a point which allows the transistor 28 to conduct.

The impedance of resistor 46 is made of substantially the same order of magnitude as the back resistance of the collector 7.

An increase in temperature produces an apparent decrease in the impedance of the reverse biased junction portion 41, which tends to turn the transistor "on." However, at the same time, there is an equal apparent decrease in the impedance of diode 47. An increased current then flows from battery 48, but the division of potential is not disturbed between the parallel impedance group including diode 47 and resistor 46 and the parallel impedance group including the reverse biased junction portion 41 and the back resistance of collector 7. Consequently, terminal 44 remains at substantially the same potential, and the threshold value of the tripping signal is not affected.

As in the previous cases, the current-temperature characteristics, the resistivity, and the area of the diode 47 must be matched to those of the reverse biased junction portion 41. Furthermore, diode 47 should be subject to the same ambient temperature as transistor 28 and should be in as close thermal relationship with it as possible.

The compensating diode 47 is in parallel with resistor 46 and carries the current variations due to changes in temperature of the transistor which would otherwise affect the current flow through resistor 46.

*Fig. 5*

This figure illustrates a modification of the circuit of Fig. 4, in which a different transistor structure is employed, although the function of the various circuit elements is essentially the same. In Fig. 5 there is shown a transistor 51 including a relatively large N region 52 and a small central P region 53. The P region 53 is connected to ground through a wire 54. On the opposite surface of the P region 52 there is attached, as by welding, an ohmically conductive annulus 55 having a central opening 55*a*. The collector 7 is connected to the N region 52 near the center of the opening 55*a* in the annulus 55 and substantially opposite the P region 53. As in the previous transistors, the spacing 4 between the collector 7 and the P region 53 must be substantially equal to or less than the diffusion length for the average lifetime of minority carriers in the N region 52.

The diode 47 which was shown only diagrammatically in Fig. 4 is illustrated more completely in Fig. 5 as being mounted in heat conducting relationship with the upper surface of the annulus 55. Diode 47 is matched as to its temperature response characteristics with the junction 57.

As in the case of Fig. 4, the grounded P region 53 serves as an emitter, being held in the "off" condition by reverse bias supplied through battery 48. As in the case of Fig. 4, an increase in the reverse current flow through the junction 57 due to changes in temperature of the transistor 51 is balanced by a corresponding increase in the current flow through diode 47, so that no change results in the potential of the annulus 55. Consequently, the transistor is substantially unaffected by such temperature changes.

Figure 6:
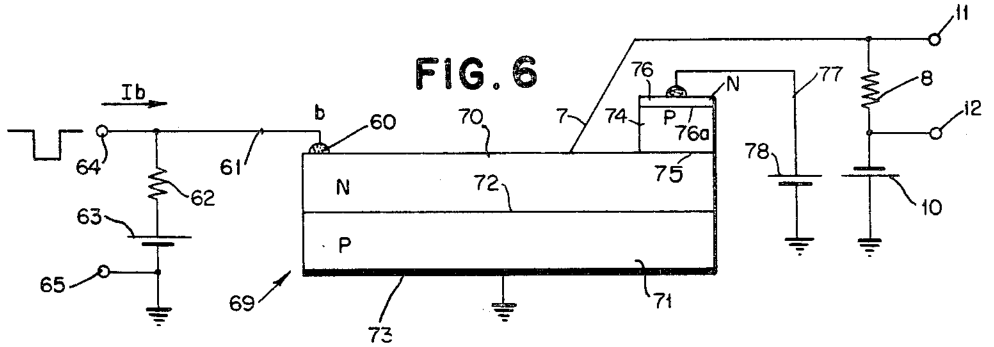

*Fig. 6*

This figure illustrates a modification of the circuits of Figs. 4 and 5, using a somewhat different transistor structure, but utilizing the same principles with regard to temperature compensation.

The transistor of Fig. 6 is generally indicated at 69, and comprises an N region 70 and a P region 71 separated by a boundary junction 72. The lower surface of the P region 71 is substantially completely covered by a low impedance contact 73. At the upper right-hand end of the N region 70, there is formed another P region 74. separated from the N region 72 by a junction 75. Above the P region 74 is another N region 76 separated from the P region 74 by a junction 76*a*. The thickness of the P region 74 between the junctions 75 and 76*a* must be substantially greater than the diffusion length for the average lifetime of minority carriers in that P region.

At the left-hand end of the N region 72 there is provided an ohmic contact 60 which is connected through a wire 61, a resistor 62 and a biasing battery 63 to ground. An input terminal 64 is connected to wire 61 and a cooperating input terminal 65 is connected to ground. The low impedance contact 73 is also connected to ground. The N region 76 is connected through a wire 77 to the positive terminal of a biasing battery 78 whose negative terminal is connected to ground.

The structure of Fig. 6 corresponds to that of Fig. 5, except that the compensating junction, which is the junction 76*a* in Fig. 6, is formed directly on the semiconductor body, instead of being made as a separate unit and welded thereon, as in the case of the compensating diode in Fig. 5. The resistor 62 of Fig. 6 corresponds to resistor 46 of Fig. 5, and the input terminals 64 and 65 correspond to input terminals 49 and 50. Batteries 78 and 63 of Fig. 6 correspond to battery 48 of Fig. 5, and may be replaced by a single battery.

The operation of the circuit of Fig. 6 is similar to that of the circuits of Figs. 4 and 5, and further description is considered to be unnecessary.

Figure 7:
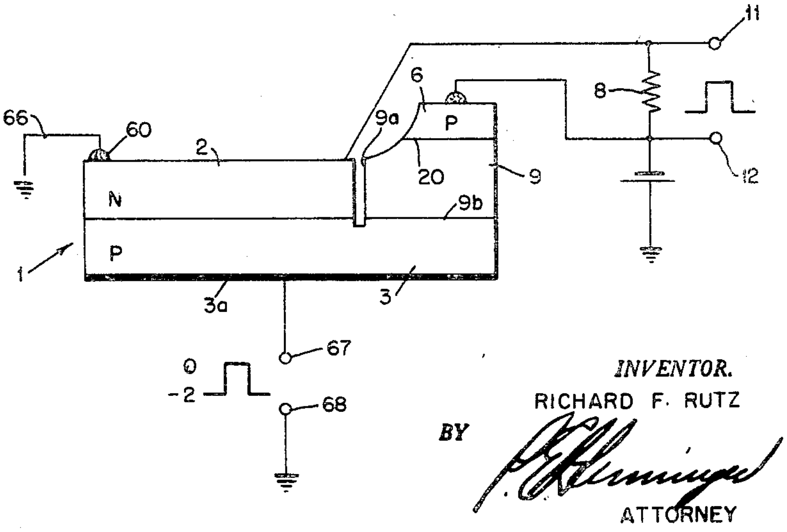

*Fig. 7*

Fig. 7 illustrates a circuit arrangement for the transistor 1, in which the N region 2 is grounded and the circuit is electrically tripped by signals transmitted through the P region 3. Ohmic base connection 60 is connected directly to ground through a wire 66. The ohmic contact 3*a* is connected to an input terminal 67 and the opposite input terminal 68 is connected to ground.

The transistor of Fig. 7 is biased to the "off" condition and this self-bias is overcome by positive going signals of suitable magnitude applied at terminals 67 and 68. The temperature compensation mechanism of this figure is the same as in the circuit of Fig. 1.

While the transistors shown and described have their collectors connected to N regions, with the conductivity types of the other regions correspondingly determined, it will be readily recognized that the conductivity types could readily be reversed from those shown, with appropriate changes in the polarities of applied potentials, etc.

In each case, the resistivity of the region to which the collector is connected should be high enough as compared to the resistivity of the other region to insure efficient emission of minority carriers. For example, a ratio of ten to one is suitable. More specifically, a resistivity of 5.0 ohm-cm. may be used for the high resistivity region and 0.5 ohm-cm. for the low resistivity region.

It should be appreciated that the structures shown and described compensate for temperature effects at a reverse biased PN junction only, which are the most serious, and do not compensate for temperature effects at other points, e. g., the back resistance of a formed point contact such as that used as a collector, which are less troublesome.

While no source of light is shown in Figs. 4 to 7, it will be readily understood that the transistors shown therein are light sensitive, and that any of them responds as readily to light signals as to electrical signals. When any of those transistors are to be used with light signals, or with both light and electrical signals, then appropriate shielding means, such as the shield 19 of Fig. 1, may be required.

While I have shown and described certain preferred embodiments of my invention, other modifications thereof will readily occur to those skilled in the art, and I therefore intend my invention to be limited only by the appended claims.

I claim:

1. Semi-conductor apparatus, comprising a body of semi-conductive material having two adjacent regions formed of materials of opposite conductivity types, said regions being separated by a first junction of substantial area, means reversely biasing at least a portion of said junction, a circuit branch connected in series with said junction, semi-conductor means defining a second junction between regions of opposite conductivity types, said second junction having an effective area and a temperature-current characteristic substantially equal to the area and temperature-current characteristic of the reversely biased portion of the first junction, means reversely biasing said second junction, and means connecting said second junction in series with said first junction and in parallel with said circuit branch, said connecting means including a conductive connection between one region adjacent said second junction and a region of the opposite conductive type adjacent said first junction, so that current flows through the respective regions of both junctions in the same order, both junctions being subjected to the same temperature, so that increments of current flow through said first junction due to temperature changes are accompanied by substantially equal increments of current flow through the second junction and the current flow through said circuit branch is substantially unaffected by temperature variations at said first junction.

2. Semi-conductor apparatus as defined in claim 1, in which said semi-conductor means includes a body of semi-conductive material physically separate from said first-mentioned body and having two adjacent regions formed of material of opposite conductivity types.

3. Semi-conductor apparatus, comprising a body of semi-conductive material having first and second adjacent regions formed of materials of opposite conductivity types, said regions being separated by a first junction of substantial area, means reversely biasing at least a portion of said junction, a circuit branch connected in series with said junction, said body having third and fourth regions formed of materials of opposite conductivity type and separated by a second junction having an effective area and a temperature-current characteristic substantially equal to the area and temperature-current characteristic of the reversely biased portion of the first junction, means reversely biasing said second junction, and means including a portion of said body, connecting said junctions in series so that current flows through the respective regions of both junctions in the same order, both junctions being subjected to the same temperature, so that increments of current flow through said first junction due to temperature changes are accompanied by substantially equal increments of current flow through the second junction and the current flow through said circuit branch is substantially unaffected by temperature variations at said first junction.

4. Semi-conductor apparatus as defined in claim 3, in which the portion of said body in said connecting means between said junctions comprises an intervening region substantially thicker than the diffusion length for the average lifetime of minority carriers in said intervening region.

5. Semi-conductor apparatus as defined in claim 3, in which said first and third regions are of the same conductivity type and are joined by said second region, said second and third regions comprising the portion of said body in the means connecting the junctions in series.

6. Semi-conductor apparatus as defined in claim 5, in which said third region lies on the opposite side of said second region from the first region.

7. Semi-conductor apparatus as defined in claim 5, in which said first and third regions are located on the same side of said second region, and are spaced apart by a notch.

8. Semi-conductor apparatus as defined in claim 7, in which said second and fourth regions are on the opposite sides of said third region.

9. Semi-conductor appartus as defined in claim 7, in which said second and fourth regions are on the same side of said third region.

10. A transistor, comprising a body of semi-conductive material having two adjacent regions formed of materials of opposite conductivity types, said regions being separated by a first junction of substantial area, means reversely biasing at least a portion of said junction, current responsive means connected in series with said junction, collector electrode means in electrical contact with said body and having a current flowing therethrough which varies as a function of the current flow through said current responsive means, signal input means for opposing said reversely biasing means and effective upon receipt of a threshold signal of predetermined magnitude to increase the current flow through said current responsive means, semi-conductor means defining a second junction between regions of opposite conductivity types, said second junction having an effective area and a temperature-current characteristic substantially equal to the area and temperature-current characteristic of the reversely biased portion of the first junction, means reversing biasing said second junction, and means connecting said second junction in series with said first junction and in parallel with said current responsive means, said connecting means extending between regions of opposite conductivity types, so that current flows through the respective regions of both junctions in the same order, both junctions being subjected to the same temperature so that increments of current flow through said first junction due to temperature changes are accompanied by substantially equal increments of current flow through the second junction, and the current flow through said current responsive means is substantially unaffected by temperature variations at said first junction.

11. A transistor as defined in claim 10, in which said semi-conductor means comprises third and fourth regions of said body formed of materials of opposite conductivity types and said collector electrode means is in electrical contact with one of said two regions.

12. A transistor as defined in claim 10, in which said current responsive means comprises an emitter of minority carriers toward said collector electrode means.

13. A transistor as defined in claim 10, including an emitter of minority carriers toward said collector electrode means, said current responsive means comprising a resistor connected in series between said emitter and a source of electrical bias potential.

14. A transistor as defined in claim 10, in which said semi-conductor means comprising a diode having a body physically separate from said first mentioned body of semi-conductive material, said diode body having two adjacent regions formed of materials of opposite conductivity types.

15. A transistor as defined in claim 14, in which said diode is connected in series with the one of the two adjacent regions opposite to that connected to the collector.

16. A transistor as defined in claim 14, in which said diode is connected in series to the one of said two adjacent regions to which the collector is connected.

17. A transistor as defined in claim 14, in which said diode is in physical heat transmitting contact with said body of semi-conductive material.

18. A transistor as defined in claim 10, in which said signal input means is effective to transmit electrical signal impulses through said first junction.

19. A light sensitive transistor comprising a body of semi-conductive material having regions of opposite conductivity types separated by a junction, means reversely biasing at least a portion of said junction, current responsive means connected in series with said junction, collector electrode means in electrical contact with said body and having a current flowing therethrough which varies as a function of the current flow through said current responsive means, signal input means for opposing said reversely biasing means, said signal input means including means to direct a beam of light on said junction and effective when a threshold signal consisting of a beam of light of predetermined intensity reaches said junction and to increase the current flow through said current responsive means, semi-conductor means defining a second junction between regions of opposite conductivity types, said second junction having an effective area and a temperature-current characteristic substantially equal to the area and temperature-current characteristic of the reversely biased portion of the first junction, means reversely biasing said second junction, and means connecting said second junction in series with said first junction and in parallel with said current responsive means, said connecting means extending between regions of opposite conductivity types, so that current flows through the respective regions of both junctions in the same order, both junctions being subjected to the same temperature, so that increments of current flow through said first junction due to temperature changes are accompanied by substantially equal increments of current flow through the second junction, and the current flow through said current responsive means is substantially unaffected by temperature variations at said first junction.

20. Light sensitive transistor apparatus comprising a transistor having predetermined temperature-current and light-intensity-current characteristics, means connecting said transistor in series with an output circuit branch, semi-conductor means having temperature-current characteristics substantially equal to those of the transistor and in heat-conductive relation with the transistor, means connecting said semi-conductor means in series with the transistor and in parallel with said output circuit branch, means defining a path for light to said transistor, and means shielding said semi-conductor means from light, so that the current flow through the output circuit branch varies as a function of the light reaching the transistor and is substantially unaffected by temperature variations at the transistor.

References Cited in the file of this patent

UNITED STATES PATENTS

| | | |
|---|---|---|
| 2,579,336 | Rack | Dec. 18, 1951 |
| 2,582,850 | Rose | Jan. 15, 1952 |
| 2,655,610 | Ebers | Oct. 13, 1953 |
| 2,659,011 | Youmans et al. | Nov. 10, 1953 |
| 2,681,993 | Shockley | June 22, 1954 |
| 2,735,948 | Sziklai | Feb. 21, 1956 |

FOREIGN PATENTS

| | | |
|---|---|---|
| 369,546 | Great Britain | Sept. 16, 1930 |